No. 659,120. Patented Oct. 2, 1900.
H. M. ASH.
TRACTION ENGINE.
(Application filed June 16, 1900.)
(No Model.) 2 Sheets—Sheet 1.

Witnesses

Inventor
Hugh M. Ash,
by H. B. Willson & Co.
Attorneys

No. 659,120. Patented Oct. 2, 1900.
H. M. ASH.
TRACTION ENGINE.
(Application filed June 16, 1900.)
(No Model.) 2 Sheets—Sheet 2.
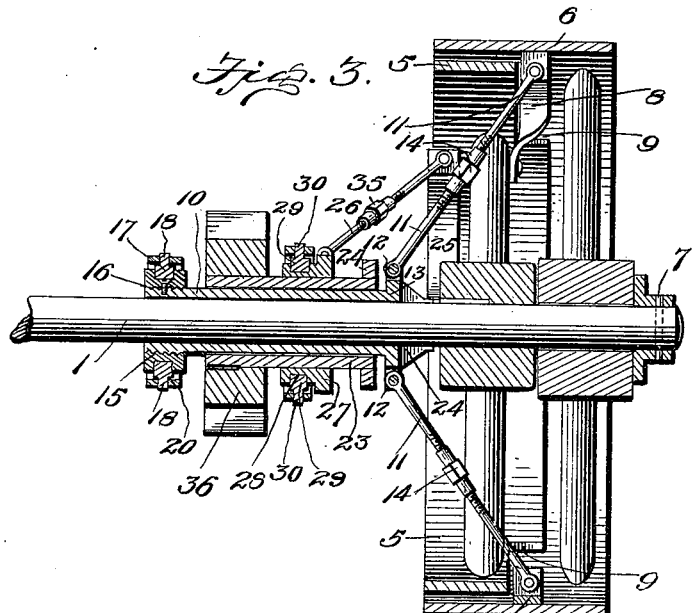
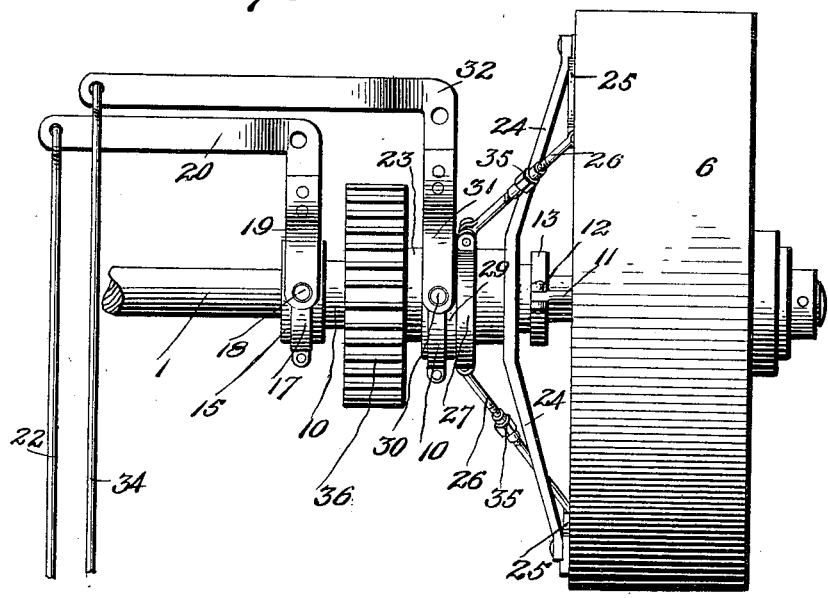
Witnesses
C. E. Hunt.
Benj. J. Cal.
Inventor
Hugh M. Ash
by H. B. Willson & Co
Attorneys

UNITED STATES PATENT OFFICE.

HUGH M. ASH, OF AGRICULTURAL COLLEGE, NORTH DAKOTA, ASSIGNOR OF ONE-HALF TO JOHN WOUTERS, OF SAME PLACE.

TRACTION-ENGINE.

SPECIFICATION forming part of Letters Patent No. 659,120, dated October 2, 1900.

Application filed June 16, 1900. Serial No. 20,589. (No model.)

*To all whom it may concern:*

Be it known that I, HUGH MALACHI ASH, a citizen of the United States, residing at Agricultural College, in the county of Cass and State of North Dakota, have invented certain new and useful Improvements in Traction-Engines; and I do declare the following to be a full, clear, and exact description of the invention, such as will enable others skilled in the art to which it appertains to make and use the same.

The invention relates to traction-engines, and more particularly to clutch mechanism for throwing the propelling mechanism of the machine in and out of gear, as well as to mechanism for throwing the separator, thresher, or other machine driven by the engine in and out of gear with the power-shaft of the engine.

The objects of the invention are to provide means whereby the attendant or operator may easily and quickly throw the propelling mechanism in and out of gear with the power-shaft of the engine; furthermore, to provide means for throwing the machine driven by the traction-engine in and out of gear with the power-shaft, and, finally, to provide means of this character which shall be simple of construction, durable in use, and comparatively inexpensive of production.

With these and other objects in view the invention consists in certain features of construction and combination of parts, which will be hereinafter fully set forth.

Figure 1:
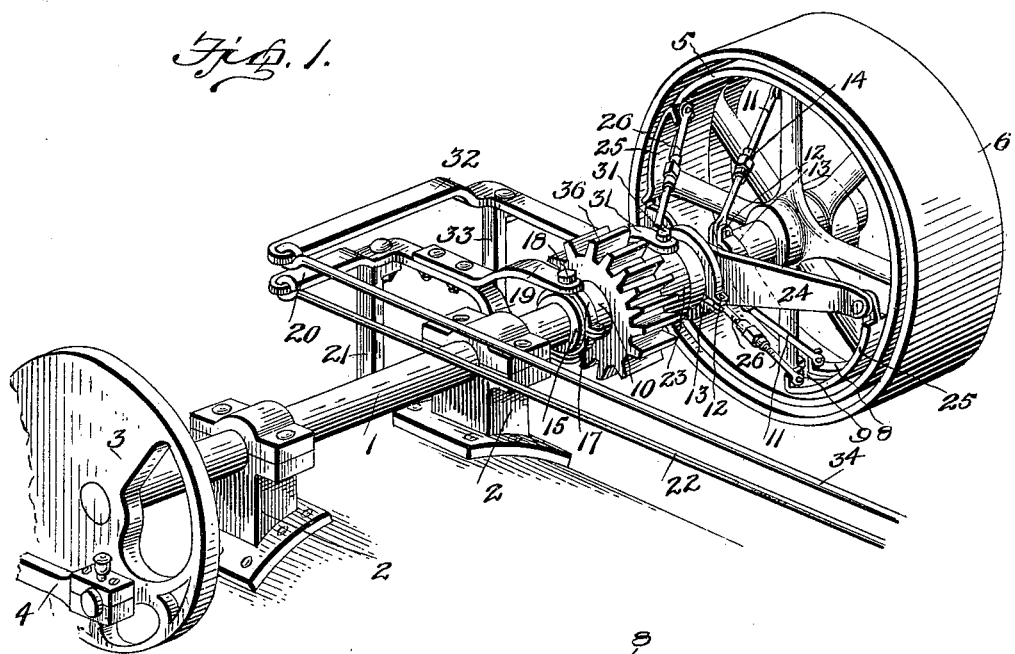
Figure 2:
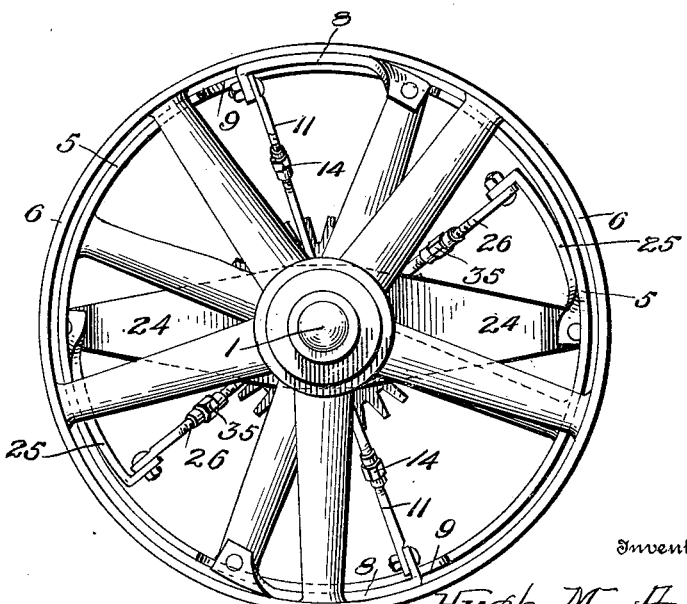

In the accompanying drawings, Figure 1 is a perspective view illustrating the application of my invention. Fig. 2 is an end view of the power-shaft, illustrating the relative positions of the clutch wheels or pulleys and the clutch-shoes. Fig. 3 is a longitudinal sectional view through the power-shaft and the parts carried thereby, and Fig. 4 is a top plan view.

Referring to the drawings, 1 denotes the power-shaft, journaled in suitable bearings 2, secured to the boiler of the traction-engine, and provided at one end with a crank-wheel 3, driven by the pitman 4 of the engine. The opposite end of the power-shaft has fixed to it a wheel or clutch-pulley 5 and is provided with a loose clutch-wheel or band-pulley 6, which is of greater diameter than the wheel 5 and surrounds said wheel and is held in place on said shaft by a pin or equivalent means 7.

8 denotes curved shoes, each of which has one end pivoted to the inner periphery of the fixed wheel and is adapted to work through a recess 9, formed in the periphery of said wheel and engage the inner periphery of the loose wheel 6.

10 denotes a sleeve mounted to slide upon the power-shaft 1 and connected to the free or outer ends of the shoes 8 by pivoted links 11, which are connected to lugs 12 of a collar 13, fixed to or formed integral with the end of said sleeve. Each link preferably consists of two parts connected together by a turnbuckle 14 for properly adjusting the parts relatively to each other.

As the shaft 1 is constantly driven and as the wheel 5 is fixed to said shaft it follows that when the clutch-shoes carried by the wheel are forced into engagement with the wheel 6 said latter wheel will be rotated in unison with the wheel 5. Power from the wheel 6 is adapted to be communicated or transmitted to the machinery to be driven— such, for instance, as a thresher or separator. The present practice is to gear the engine with the machinery to be driven and then start the engine. This is objectionable in that it is very difficult to start the engine under a heavy load, and manual labor is oftentimes required to assist the engine in getting the machine into operation. By my improvement the engine is first started, and by frictionally connecting the wheel 6 with the wheel 5 the machinery to be driven is easily started and without the requirement of manual labor, as above described. Any suitable means may be employed for operating the clutch-shoes; but that shown in the accompanying drawings is preferred and consists in screwing upon the inner end of the sleeve 10 a collar 15, which is locked in place by a set-screw 16. This collar has a grooved periphery, in which is seated a band 17, having studs or trunnions 18, to which are pivoted the forked arms 19 of a crank-lever 20, which in turn is pivoted to a post 21, secured to the boiler-sheet of the engine, and is operated by a rod 22, leading to within convenient reach of the engineer or attendant.

23 denotes a sleeve which embraces the sleeve 10 and is provided at one end with radial diametrically oppositely projecting fixed arms 24, to the extremities of which are pivoted curved clutch-shoes 25, which are adapted to engage the inner periphery of the fixed wheel 5 and lock said sleeve to turn with said wheel. The free or outer ends of the shoes 25 are pivotally connected by means of links 26 to a collar 27, mounted to slide upon the sleeve 23 and provided with a groove 28, within which fits a ring 29, provided with studs 30. Pivoted to the studs 30 are the forked ends 31 of a crank-lever 32, which in turn is pivoted upon a post 33, secured to the boiler-sheet of the engine, and is operated by a rod 34, which leads back within convenient reach of the attendant or engineer. The links 26, like the links 11, are each composed of two parts, connected together by a turnbuckle 35 to insure nicety of adjustment of the friction or clutch shoes 25 with respect to the wheel 5.

36 denotes a driving-pinion which is adapted to be connected to the propelling mechanism of the traction-engine by any well-known form of gearing, and as this gearing and the manner of arranging it forms no part of the present invention I have not deemed it necessary to illustrate it, nor do I deem it necessary to describe it. Suffice it to say, however, that when the friction-shoes 25 are locked in engagement with the wheel 5 the sleeve 23 will rotate in unison with the power-shaft and will rotate the pinion 36 and transmit its movement to the propelling mechanism of the traction-engine for moving said engine from one point to another. Obviously when the shoes 25 are thrown out of engagement with the wheel 5 the traction-engine will come to a halt.

In operation, assume the traction-engine to be in a field and the wheel 6 connected by a belt with the machine to be driven and the clutch-shoes 8 and 25 out of frictional engagement with their respective wheels and power applied to the shaft 1. The engine is now in operation, and the shaft 1 and its fixed wheel 5 are rotating. It is now desired to transmit the power from the shaft to the machine to be operated. This is done by drawing upon the rod 22, which operates the crank-lever 20 to slide the sleeve 10 outward, thus spreading the links 11 and forcing the shoes 8 through the slots 9 in the wheel 5 into engagement with the inner periphery of the wheel 6. At the instant of contact of the shoes 8 with the wheel 6 said wheel may slip slightly; but as the machine driven by said wheel gets into motion the impetus or momentum thereof will cause it to move more freely and the shoes 8 to rotate in unison with the wheel 6. A reverse movement of the rod 22 will shift the parts to throw the wheel 6 out of gear with the power-shaft.

When it is desired to move the traction-engine from one point to another, the rod 34 is operated and through its intermediate mechanism throws the shoes 25 into engagement with the inner periphery of the wheel 5, thus locking the sleeve 23 to said wheel 5, and as the power-pinion 36 is fixed to said sleeve said pinion will be rotated and will transmit its power to the propelling machinery of the engine.

From the foregoing description, taken in connection with the accompanying drawings, the construction, operation, and advantages of my invention will be readily understood without requiring an extended explanation. The invention is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what is claimed, and desired to be secured by Letters Patent, is—

1. The combination with the constantly-driven power-shaft, of a band-wheel loosely engaged therewith and adapted to be connected by a belt to the machinery to be driven, a wheel fixed to said power-shaft, a friction-shoe carried by the fixed wheel, and means for forcing it into frictional contact with the loose wheel to lock said latter wheel to the shaft to turn in unison therewith, substantially as set forth.

2. The combination with a power-shaft, of a loose and fixed wheel carried thereby, a drive-gear loosely mounted on the power-shaft, frictional shoes to engage the fixed wheel to lock said gear to turn in unison therewith, friction-shoes carried by the fixed wheel and adapted to frictionally engage the loose wheel and lock said loose wheel to the fixed wheel, and means for operating said friction-shoes, substantially as set forth.

In testimony whereof I have hereunto set my hand in presence of two subscribing witnesses.

HUGH M. ASH.

Witnesses:
  BENJ. G. COWL,
  C. H. BENNISON.